Jan. 29, 1935.  C. W. GREEN  1,989,314
CASH REGISTER
Filed May 10, 1930   5 Sheets-Sheet 5
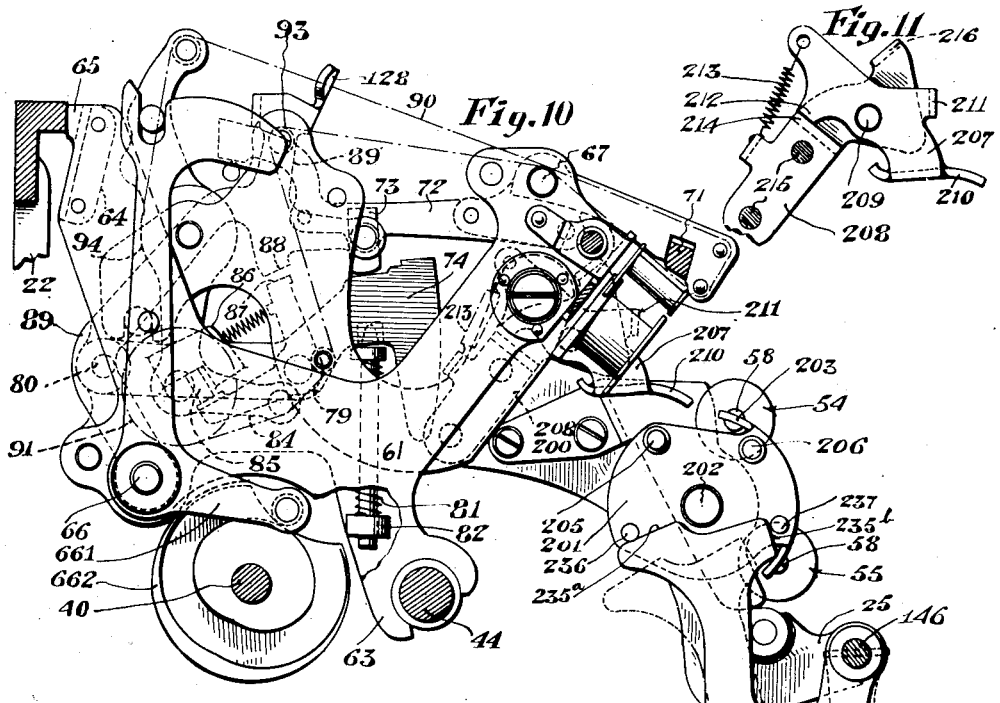
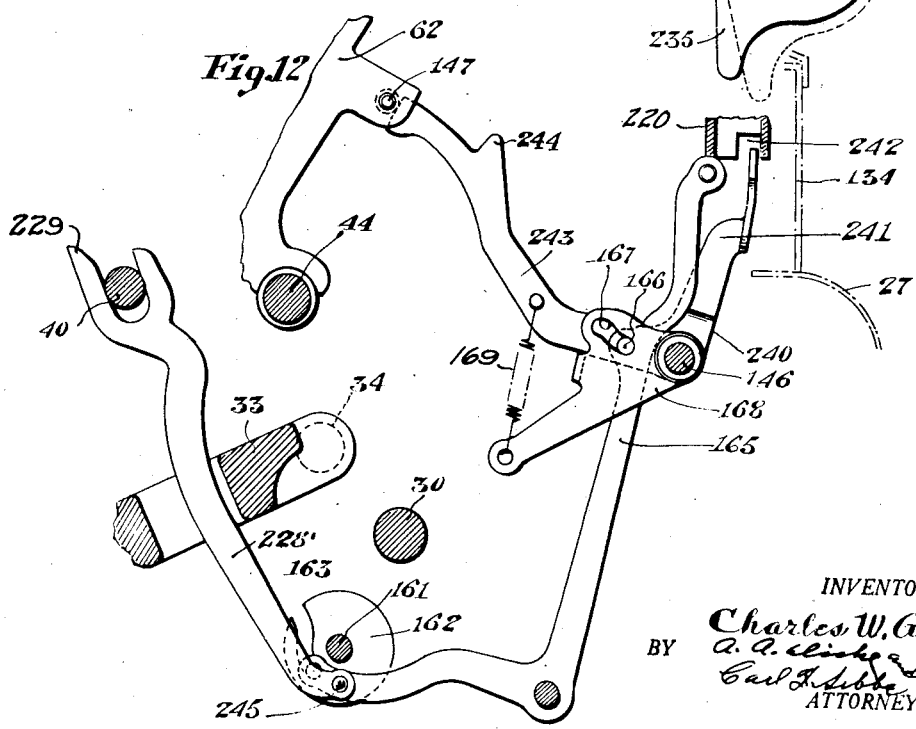
INVENTOR.
Charles W. Green
BY
ATTORNEYS.

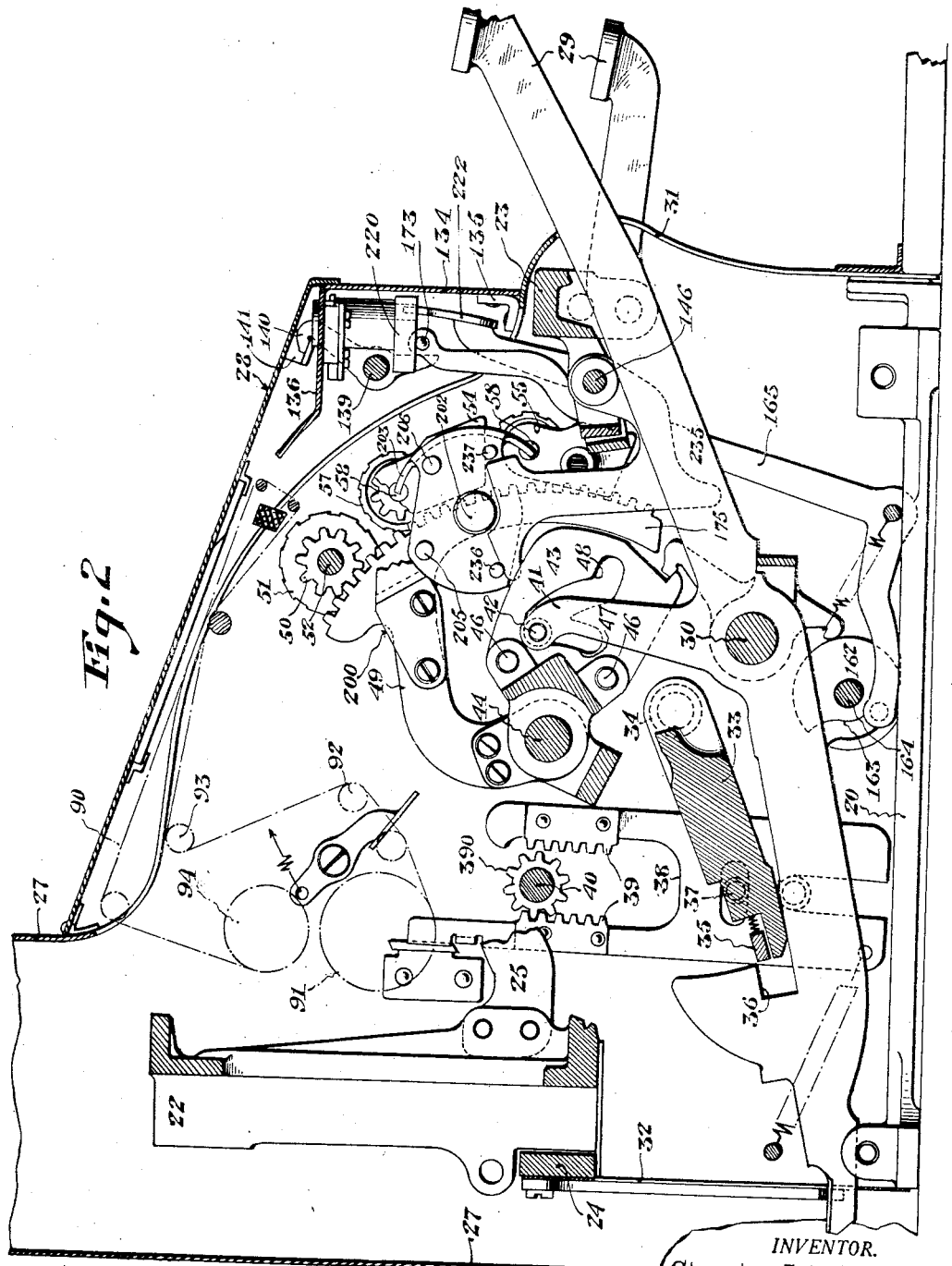

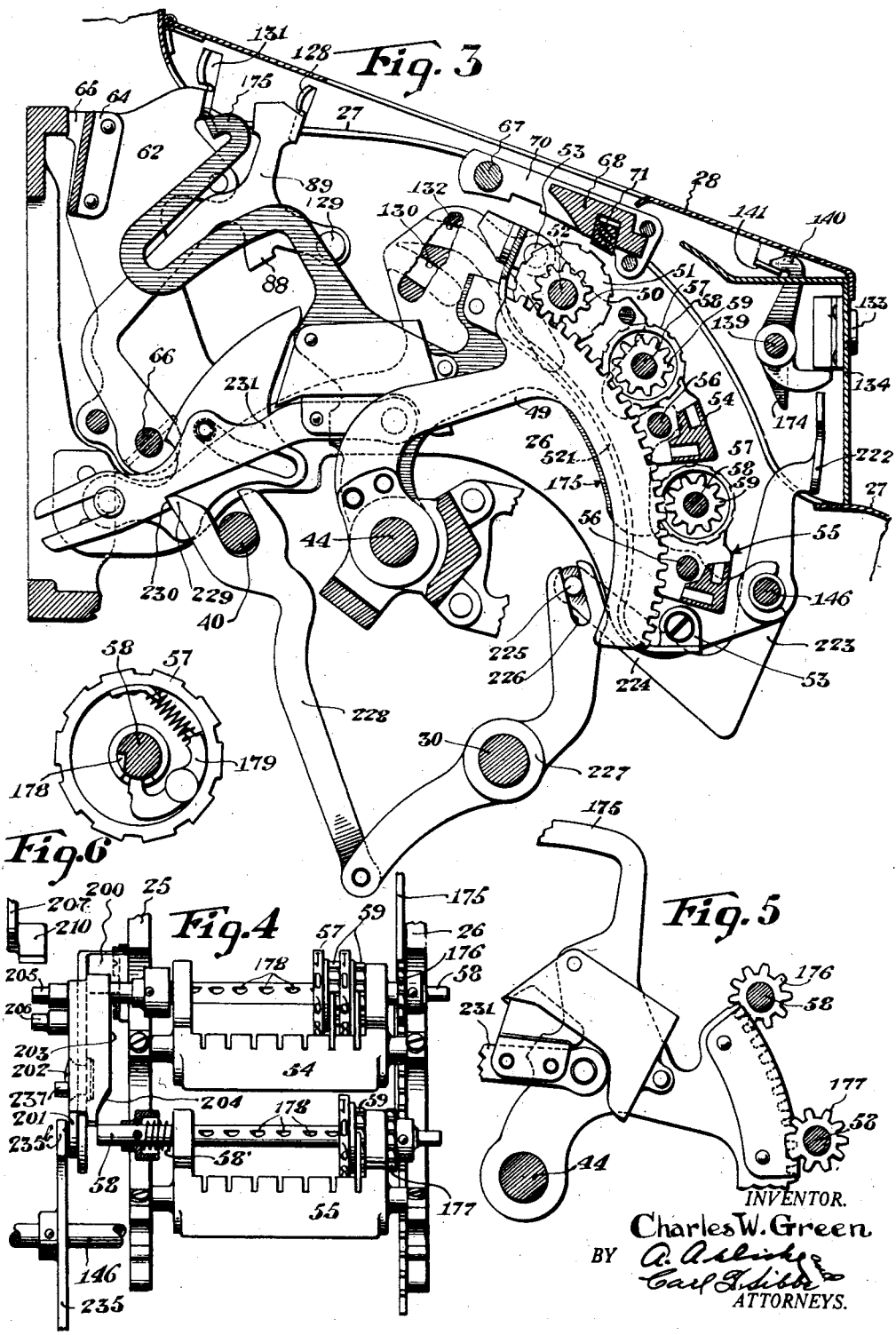

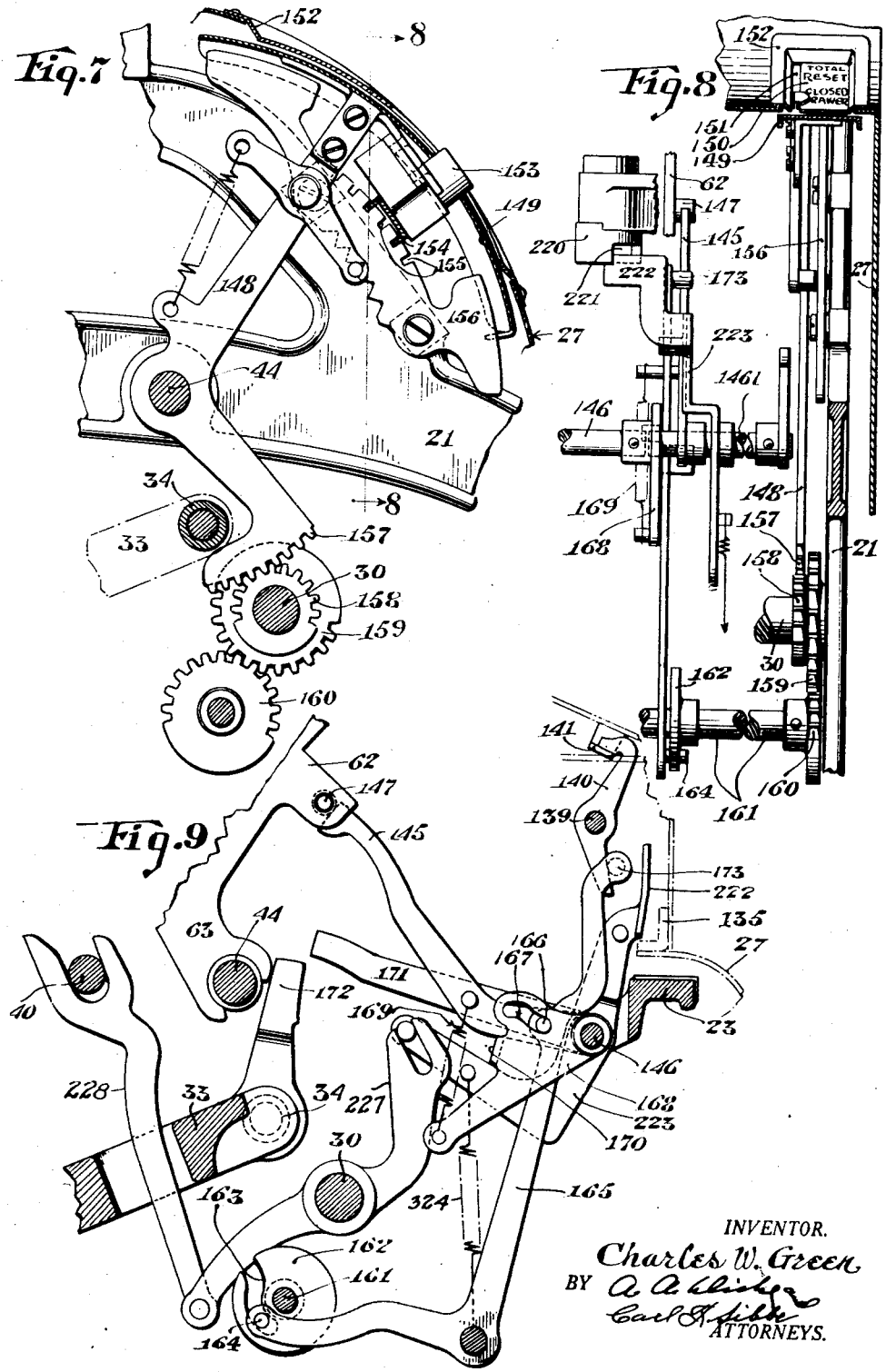

Patented Jan. 29, 1935

1,989,314

UNITED STATES PATENT OFFICE 1,989,314

CASH REGISTER

Charles W. Green, Ilion, N. Y., assignor, by mesne assignments, to The National Cash Register Company, Dayton, Ohio, a corporation of Maryland Application May 10, 1930, Serial No. 451,245

20 Claims. (Cl. 235—130)

This invention relates to cash registers and accounting machines, generally and more particularly to that class employing printing devices for printing accumulated items and totals.

The present invention is shown in connection with a register generally used in chain stores, department stores or the like where supervision of a number of registers is controlled by some person generally known as the auditor.

In the above type of machine and in cash registers in general, it frequently occurs that auditors or proprietors, in the process of taking records of the accumulated totals and resetting the totalizer elements, manipulate the reset devices before printed records of the accumulated totals have been taken. To preclude this possibility, the present invention features a device which is fully automatic and positive in operation whereby printing of totals on a continuous record strip is compelled before the totalizers can be reset.

It therefore is an object of the present invention to provide means, associated with the printing mechanism to compel the printing of a total before resetting of a totalizer may be effected.

Another object of the present invention is to provide a device, which is fully automatic in operation and in which the printing of an accumulated total will condition the totalizer for a clearing or resetting operation.

A further object of the present invention is to provide means whereby the conditioning of a totalizer for reset, subsequent to total printing, will be disabled and returned to normal if the machine is reconditioned for normal accumulation.

The above objects apply with equal force to each of two modified embodiments of the present disclosure.

Another object of the present invention is to provide in one specific embodiment (Fig. 12), a lock and so arranged that when it is adjusted to a certain position it will permit the printing and resetting of certain totals and at the same time prevent the printing and resetting of certain others.

A further object of the present invention is to provide in the same embodiment, key controlled means to enable printing from and resetting of a secret totalizer.

A still further object of the present invention is to provide, in a different embodiment (Figs. 1–11), a lock controlled device for controlling printing from a plurality of totalizers, and an additional lock for controlling resetting thereof.

With these and other incidental objects in view, the invention consists in certain novel features of construction and combination of parts, the essential elements of which are set forth in the appended claims and two preferred forms of embodiment of which are hereinafter described with reference to the drawings which accompany and form a part of this specification.

Of the drawings:

Fig. 2 is a sectional view of the cash register taken on line 2—2 of Fig. 1, showing some of the operating keys, a portion of the printing devices, the differential and actuators for driving the totalizer elements and the mechanism for conditioning the totalizers for a clearing operation.

Fig. 3 is a partial sectional view taken substantially through the center of the machine, showing among other elements certain parts comprised in the total printing means, a full stroke reset lever and a portion of the interlocking mechanism between the resetting devices and the control lever.

Fig. 4 is a front elevational view with parts omitted showing a portion of my device for conditioning the totalizers for resetting.

Fig. 5 is a side view showing certain elements of the resetting mechanism in an off-normal position.

Fig. 6 is a sectional view taken adjacent to a totalizer wheel showing the arrangement of the pawl carried thereby with respect to the notch in the shaft with which it cooperates during the resetting operation.

Fig. 7 is a sectional view showing the general control lever and the lock for holding it in its various positions of adjustment.

Fig. 8 is a view taken on line 8—8 of Fig. 7.

Fig. 9 is a view in side elevation showing various interlocks between the operating mechanism, printing mechanism and the lids.

Fig. 10 is a view in elevation showing the selective printing mechanism and the means for compelling printing of a total before resetting can be effected.

Fig. 11 is a detail view showing the portion of the printer frame which carries the actuating means for the mechanism which compels total printing before resetting can be effected.

Fig. 12 is an elevational view of a modified construction showing another form of mechanism for controlling printing and resetting of the totalizers.

Figure 1:
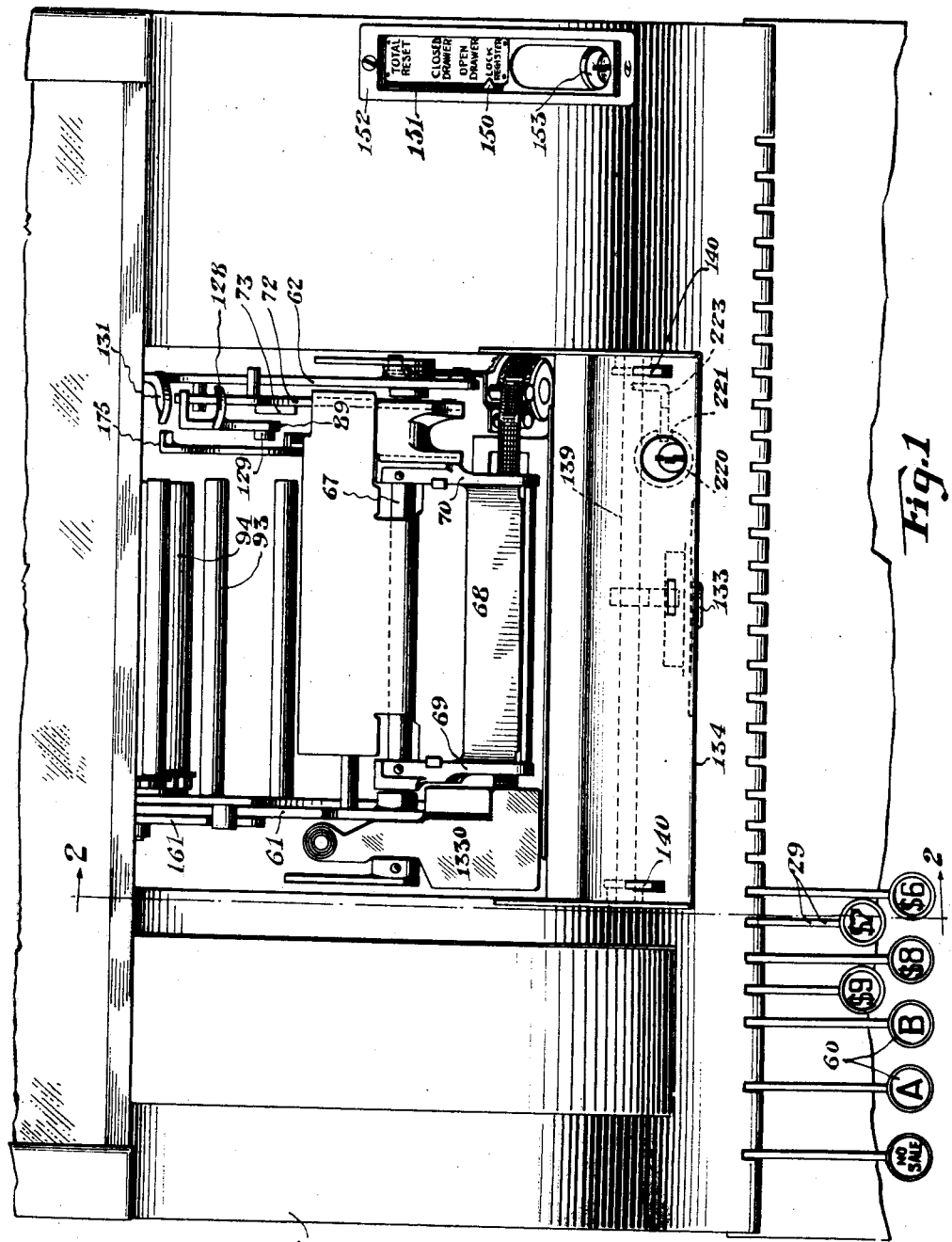
Fig. 1 is a plan view of the cash register to which the present invention is applied, showing the clerk's keys and a few of the amount keys for item entering operations. One of the cabinet lids has been removed to more clearly illustrate the printing devices and the lock permitting the resetting of the totalizers.

Reference to the detailed description which follows and which is divided under suitable headings will give a full understanding of the various features embodied in the present invention and their intended mode of operation.

For the purpose of illustration this invention has been shown as applied to a type of machine the general principle of which is disclosed in applicant's copending application, Serial Number 35,599, filed June 8, 1925 Patent No. 1,870,004, issued August 2, 1932. However, the invention is applicable to any type of machine, the general principle of which is disclosed in United States patent to Frederick L. Fuller, Number 1,742,701.

It is understood, however, that this invention is not limited to this type of machine, but may, with slight modifications be applied to other well known forms of accounting machines.

*Framework*

The various parts of the mechanism are supported by a suitable framework comprising a base casting 20 (Fig. 2) and suitable side frames, a portion of one is shown in Fig. 7 and 8 and is indicated by reference character 21. The main side frames are connected at their upper rear ends by a framework 22 and cross connections in the form of tie bars 23 and 24 situated between the front and rear of the machine respectively. The present machine is also provided with two intermediate and parallel supporting frame 25 and 26, (shown in Figs. 3 and 4). The mechanism is enclosed by a cabinet 27 (Figs. 1 and 2) which has hinged thereto a flat lid 28 so that access may be had to the printing mechanism for replenishing the paper supply and permitting total printing.

*Keys and operating mechanism*

The illustrative machine is provided with a number of groups of amount keys, one group for entering amounts from 1¢ to 9¢, the second group for registering amounts ranging from 10¢ to 90¢ and a third group for amounts ranging from $1. to $9. Since the construction and operation of the keys related to the various groups are alike a description of the manner of operation of one of the groups will suffice for all. To this end the operation of the keys related to the dimes groups will be given, reference being had particularly to Fig. 2.

The amount keys 29 associated with the dimes bank are pivoted upon a shaft 30 extending transversely of the machine and journalled between the side frames. The keys are guided in their reciprocating movements by slots 31 formed in the front part of the cabinet 27 and are further guided at their rearward ends by a vertically slotted plate 32 attached to the tie bar 24 and the base 20.

Resting upon the rear ends of the keys is a key coupler 33 journalled at 34 between the side frames. The key coupler has a nose 35 co-operating at times with notches 36 formed in the rear ends of the keys 29. When the outer ends of the keys are depressed the key coupler is rocked clockwise (as viewed in Fig. 2) and the nose 35 enters the notches 36 formed in the rear end of the keys. The purpose of such key coupler mechanism is well known in the art and need not be discussed herein.

Connected to the key coupler 33 at 37 is a vertically reciprocating rack plate 38 provided with oppositely facing rack teeth 39 which alternately mesh with a gear 390 fast to a main operating shaft 40 journalled between the machine side frames. The arrangement of this mechanism is such that a reciprocation of the key coupler 33 by the keys will effect a complete rotation of the gear and the shaft 40 to which the gear is secured. The shaft 40 is provided with cams or other suitable devices for operating various parts of the registering and printing mechanisms.

Some suitable form of full stroke mechanism to compel a complete operation of the machine when once started may be provided, but since mechanism for accomplishing this function is well known in the art it need not be described in detail herein. For a full disclosure of this mechanism reference may be made to the Fuller patent previously mentioned.

*Differential mechanism*

The differential mechanism or the devices controlled by the various groups of keys for adjusting the item type carriers and actuating the different totalizers are all similar in construction and principle of operation and a description of one will suffice for all.

As best shown in Fig. 2, each of the amount keys 29 is provided with an upwardly extending arm 41 carrying a suitable anti-friction roller 42 co-operating with differential slots formed in cam plates 43. Loosely mounted upon a transverse shaft 44 is a frame 45 provided with spaced slots in which are secured by pins 46, a series of the cam plates 43 one for each key. The cam plates 43 are provided with L shaped slots 47 and 48, the slots 47 being concentric with respect to the shaft 44. The slots 48 are, however, graduated so that when the roller 42 carried by the arm 41 of a depressed key 29 operates in the slot 48 of its associated cam plate 43 it will move the frame 45 differentially and to an amount commensurate with the value of the key depressed. When, however, the frame 45 is operated by the depression of a key 29 of a certain group the rollers 42 of the undepressed keys of the same group will play in the arcuate slots 47 thereby permitting the frame 45 to be raised differentially without interfering with the rollers 42 of the unoperated keys.

It is to be understood that there is a differential frame for each group of amount keys, and that each frame is similarly constructed so that if three keys relating to the same number of groups are depressed the frames will be operated differentially to amounts commensurate with the values of the keys depressed.

As is best shown in Fig. 3 the differential frame 45 has attached thereto a segmental rack 49. In continuous mesh with the teeth of the segmental rack 49 is a pinion 50 attached to an item type wheel 51 mounted upon a shaft 52 and adapted to print upon a record strip. From the above it will be evident since there may be nine keys in a particular group and a corresponding number of cam plates 43 the segmental rack 49 and type carrier 51 may be brought to any one of the nine different positions by the depression of a key 29 associated with such group of keys. In a manner similar to this the keys associated with any of the differential groups will adjust their related type carriers so that when printing is effected the type wheels will print characters corresponding to the value of the keys depressed. In order to guide the segmental rack 49 associated with the three groups of keys in their reciprocating movements there is provided a bent plate 521 which extends between the intermediate frames 25 and 26 and is attached thereto by means of screws 53. The plate 521 is provided with a series of slots through which the several segmental racks 49 project so as to guide the latter during their reciprocating movements.

*Totalizers and totalizer engaging mechanism*

Situated below the type carriers 51 are two pivotally mounted totalizers 54 and 55. The form of the totalizers is shown in the Fuller patent hereinbefore mentioned and generally in Fig. 3. Each totalizer is pivotally mounted at 56 between the intermediate frames 25 and 26. The wheels 57 for each totalizer are mounted upon a shaft 58 journalled in the totalizer frame and the peripheries of the wheels are formed with raised characters so as to effect printing upon a suitable impression material. Attached to the totalizer elements are pinions 59 which are adapted at times to be brought into mesh with the teeth of the segmental rack 49 by rocking the desired totalizer frame about its pivotal point 56.

The totalizers 54 and 55 may be utilized for the purpose of registering amounts for separate departments or clerks or to segregate the transactions into any other two classes. The entering of the items into the totalizers selectively is directly controlled by means of a group of two clerk's keys designated by reference characters 60 and shown in Fig. 1. In practical use each clerk is assigned a particular totalizer and the corresponding clerk's key so that the proprietor is able to ascertain the amount of the sales of the respective clerks operating the machine. By simply adding together the amounts of the sales of the clerks the aggregate amount of business transacted by all the clerks during a particular period may readily be obtained.

The engagement of the selected totalizer with the actuators is directly under control of its corresponding clerk's key 60, and the means for accomplishing this is shown and described fully in the Fuller patent hereinbefore mentioned. In general terms however, it may be stated here that suitable mechanism is adapted to be operated by a clerk's key to cause the pinions of the desired totalizer to be brought into operative relationship with the teeth of the segmental rack before the latter is moved differentially. During the downward depression of the amount keys the frames 45 will be operated differentially and by means of the engagement of the totalizer pinions and the operated segmental rack 49 an amount will be inserted in the totalizer commensurate with the value of the key or keys depressed. At the extreme end of the downward stroke, or if desired, during the first part of the upward stroke of the keys the selected totalizer is disengaged from the actuators and remains disengaged during the time the keys are returned to their normal position.

*Record strip printing mechanism*

It is desirable each time an item is entered in the machine that its amount as well as a character designating the clerk operating the machine to be printed upon a record strip. The record strip thereby provides a complete record of all the transactions entered in the machine, and at the end of any particular period it may be detached from the machine and stored away for future reference. The printing mechanism for printing these items as well as the totals standing upon the totalizer comprises a pivoted printing frame formed of two side plates 61 (Figs. 1 and 10), and 62 (Figs. 1 and 3), the lower ends of which are provided with claws 63 overlying the shaft 44. The frames 61 and 62 are connected together by a cross member 64 and shafts and other members which will be referred to hereinafter. Normally the printing mechanism rests by its own weight in the position shown in the figures with lugs 65, integral with the side frames 61 and 62, contacting with a portion of the frame 22. In this normal position the printing mechanism is adapted to print the items entered in the machine upon the record strip, but it may be rocked downwardly under the control of separate manipulative devices to print from either the upper totalizer or the lower totalizer as will be more clearly described hereinafter.

Journalled in the printing side frames 61 and 62 is a shaft 66, the extreme left of which has fastened to it a bell crank 661 (Fig. 10) carrying a roller which co-acts with the race of a box cam 662 fast to the shaft 40. As has been mentioned hereinbefore the shaft 40 is given a complete rotation during each operation of the machine and the rotation of the box cam will rock the shaft 66 to actuate a platen and to feed the record strip and the inking ribbon.

Extending transversely of the printer side frames 61 and 62 is a platen supporting shaft 67 upon which is supported a platen 68 by means of forwardly extending arms 69 and 70 (Fig. 1) secured to the shaft 67. The under face of the platen is provided with a rubber impression block 71 as clearly seen in Figs. 2, 3, and 10.

Extending rearwardly from and movable with the right arm 70 is a platen actuating arm 72 attached to which is a block 73 which is actuated by a hammer 74 to force the impression block 71 against the type to take an impression.

For actuating the platen 68 to take an imprint the hammer 74 (Fig. 10) is provided and is formed as part of an arm 79 pivoted to the inside of the right printer side frame 62 by a stud 80. The hammer 74 is normally urged upwardly by means of a spring 81 bearing against a lug 82 carried by the right printer side frame 62. The arm 79 is provided with a spring-pressed retracting pawl 83 having a tail 84 bearing against a stop 85 passing through a member 86 attached to the arm 79. The pawl 83 has a lug 87 co-operating with a nose 88 formed as part of an arm 89 (best shown in Figs. 3 and 10) secured to the main printer shaft 66. When the arm 89 is rocked clockwise during an item entering operation as viewed in Fig. 10, by means of the bell-crank and the shaft 66 to which the bell-crank is secured, the nose 88 will bear against the lug 87 of the pawl and retract the hammer 74 against the tension of the spring 81. Upon a further movement of the arm 89 the nose 88 will clear the lug 87 of the pawl 83 and permit the hammer portion 74 to strike the lug 73 and through the connections heretofore described rock the platen 68 downwardly to effect a printing impression from the adjusted type carriers.

The record strip upon which are printed items and totals is best shown in Fig. 2, the record strip 90 extending from a supply roll 91 around suitable guide rollers 92 and 93, around the platen 68, around other guide rollers and finally back to a storage roll 94. The details of the record strip, as well as the means for advancing it during an operation of the machine are fully set forth in the before-mentioned Fuller patent and need not be described herein.

Total printing

As has been premised hereinbefore the printer frame is normally in such a position as to print the items entered in the machine upon the record strip, but it may be rocked downwardly under the control of separate manipulative devices to print from either totalizer by means which will now be described in detail.

To take the total from the upper totalizer all that is necessary is to swing the printer frame until the platen is directly over the totalizer and when the platen is in this position it will automatically be actuated and the total standing on this totalizer printed upon the record strip.

To rock the printer frame downwardly there is provided a manipulative device 128 (Figs. 3 and 10) which is integral with the arm 89 heretofore mentioned. The manipulative device 128 has secured thereto a stud 129 which is adapted to cooperate with a groove 130 formed in an upward extension of the right hand supporting frame 26, which it will be recalled, serves as a support for the totalizers and the item printing wheels. Thus, when it is desired to take a total from the upper totalizer the manipulative device 128 is grasped and by drawing it forward the printer frame will follow and rock about the shaft 44 as a pivotal point, while at the same time the lever 89 will rock slightly about shaft 66 and the stud 129 will enter the groove 130. Further movement of the printer frame will, due to the eccentric shape of groove 130, cause further clockwise rotation of the shaft 66 to the same extent that the box cam 662 rocks it during a regular operation of the machine. The parts are so proportioned that the printing hammer 74 will be released at substantially the time that the platen 68 overlies the total printing elements of the upper totalizer. The end of the groove 130 serves to positively stop the forward movement of the printer frame when it is in its proper position to print a total from the totalizer. Whenever a total is printed the record strip will be fed in a manner described in detail in the Fuller patent so that after each total printing operation, just as in item printing operations, the record strip will be fed an increment.

In order to obtain the total of the amounts standing on the lower totalizer there is provided a manipulative device 131 which is integral with the right printer side frame 62. As best shown in Fig. 3 it will be seen that the supporting frame 26 is provided with a second slot 132 longer than the slot 130 previously referred to and having a different curvature. The stud 129 referred to hereinbefore is adapted also to cooperate with the slot 132. When the printer frame is rocked about its pivotal point by means of grasping the manipulative device 131 and drawing it downwardly the stud 129 will first be moved in an arc about the shaft 44 as a center and will enter the slot 132 which will subsequently cause a relative turning movement of the shaft 66 in the frame, thereby retracting and releasing the hammer 74 for printing at substantially the time the platen is over the lower totalizer.

In order to cover and conceal the record strip printing devices and totalizers, the lid 28 previously referred to is provided. The lid 28 is controlled by a lock 133 (Figs. 1 and 3) carried by the hood 134 attached to the cabinet 27. The key of this lock is usually retained by the clerk operating the machine so that he can raise the lid 28 to obtain access to the paper holding mechanism in order to replenish the supply of paper when it is exhausted. It will be apparent from an inspection of Fig. 2 that the hood 134 just referred to is a stationary part of the cabinet 27, being riveted thereto by the suitable angle pieces shown at 135. It will also be seen that the side plates of the hood conforming with the front of the cabinet afford an added means to better secure said hood if desired. The top portion 136 of the hood 134 being well secured affords complete protection for the totalizers.

Locks for controlling total printing

As shown in Fig. 3 the manipulative devices 128 and 131 for obtaining the printed totals are located under the lid 28 and since the clerks operating the machine have possession of the keys for the lock controlling the release of this lid an additional lock is preferably provided for preventing unauthorized persons from operating the manipulating devices for securing the printed totals. This lock comprises a rearwardly extending arm 145 (Figs. 8 and 9) secured to a shaft 1461 in alignment with but rockable independently of a shaft 146, (Fig. 8) the arm 145 having its end normally in the path of a stud 147 secured to the right printer side frame 62. When the locking arm is in this position it will be impossible to rock the printer frame downwardly to take a total and in order to unlock the printing mechanism to perform total printing there is provided a supplemental lock which has connections to the arm 145 to control it so as to bring it out of engagement with the stud 147 carried by the right printer side frame. The lock and the connections to the arm 145 will now be described, reference being had particularly to Figs. 7, 8 and 9.

Loosely pivoted upon the segment shaft 44 is a control lever 148 having secured thereto a concentric plate 149 slidable beneath the cabinet 27 of the machine. The plate 149 carries a pointer 150 which is slidable in a slot 151 formed in a plate 152 attached to the machine cabinet, the said plate bearing at the desired places engraved characters and words representing the different controls over the machine, such as, "Closed Drawer" operation in which the closing of the cash drawer is compelled before the machine can be subsequently operated; "Open Drawer" operation in which the machine may be operated without necessitating the closing of the cash drawer during successive registering operations; "Lock Register" condition under which the registering mechanism is entirely locked against operation and the fourth or uppermost position of the pointer may be what is known as "Total and Reset" position and when the control lever is adjusted to this position the cabinet lid 28 is unlocked and the machine conditioned for printing totals and resetting the totalizers.

Only the mechanism which is appurtenant to the last mentioned position will be described, as the other devices form no part of the present invention and need not be described herein in detail. For further and full disclosures of the remaining features, reference may be had to the Fuller patent previously mentioned.

Attached to the plate 149 by any desirable means is a lock 153 which projects through a slot in the plate 152 and has at its lower end a flange 154 to engage notches 155 in a plate 156 attached to the side frame 21. The flange 154 is provided with a slot (not shown) which is adapted to be brought in the plane of the plate 156 by rotation of the lock.

To adjust the control lever to the "Total and Reset" position all that is necessary is to insert the key in the lock to rotate the barrel a quarter turn and thereby bring the slot in the flange 154 into the plane of the plate 156 and move the key and parts movable therewith so that the index points to the desired legend. The key is then given a quarter turn in the reverse direction so that the flange 154 of the barrel will cooperate with the adjacent notches 155. Upon removal of the key the control lever will be locked in its set position.

The lever 148 is provided with a rack segment 157 meshing with a gear sector 158 fast to the right hand end of the key shaft 30. Also secured to this shaft is a somewhat larger gear sector 159 meshing with another gear sector 160 rigidly mounted on a transverse shaft 161 which carries toward the center of the machine a disk 162 formed with a cam slot 163 (Figs. 2 and 9) cooperating with a stud 164 carried by the rearward arm of a bell crank 165.

The upper arm of the bell crank 165 carries a pin 166 cooperating with a cam slot 167 formed in an arm 168 pinned to the shaft 146 carried by the tie bar 23. A spring 169 is connected between the rearward end of the arm 168 and the locking member 145 so that the lower edge of the locking member 145 contacts with a lug 170 formed on the arm 168. The slot 163 formed in the disk 162 is provided with a dwell and a camming portion, the result of this being that if the control lever is moved to any of the three lower positions there would be no effect upon the bell crank 165, or the arm 168. However, when the control lever is moved upwardly to the "Total and Reset" position the shaft 161 will be rocked sufficiently so that the cam portion of the slot just mentioned will become effective. The result of this is that the cam portion of the slot 167 will cause the arm 168 to be rocked counterclockwise and through the spring connection will permit the lowering of the arm 145 to bring it out of engagement with the stud 147 carried by the right printer side frame.

The printing mechanism is now unlocked for operation, thereby permitting the printing of totals from either totalizer as desired. Also secured to the shaft 1461 to which the locking arm 145 is secured is another locking arm 171 which is adapted to be brought in front of an arm 172 carried by the key coupler 33. It will, therefore, be seen that when the arm 145 is lowered to release the printing mechanism the arm 171 will pass in front of the arm 172 thereby locking the key coupler and the operating keys as long as the printing mechanism is unlocked for total printing operations.

It is necessary, of course, before total printing can be accomplished by operation of the various manipulative devices 128 and 131, to unlock the lid 28 previously mentioned. This, of course, can be accomplished by the operation of the lock usually controlled by the clerk as before described. However, the illustrative embodiment also includes means whereby when the control lever is moved to the "Total and Reset" position it will also operate the shaft 139 to disengage the hooks 140 from the flanged studs 141. To this end the extreme upward end of the bell crank 165 is provided with a pin 173 cooperating with an extension 174 of one of the lid locking pawls which is fast to the shaft 139 previously mentioned. Rocking of the bell crank 165 by movement of the lever to the "Total and Reset" position will, therefore, rock the shaft 139 to release the lid 28.

*Resetting devices*

After the amounts of the sales for a day or other regular interval have been entered in the machine and the total thereof printed upon the record strip, it is desirable usually to reset the totalizers so that the sales occurring during a subsequent period only will be registered in the totalizers. The means for accomplishing this function is best shown in Figs. 3, 4, 5 and 6. It will be seen that a resetting segment 175 is loosely mounted upon the shaft 44 and provided with teeth to engage pinions 176 and 177 secured to the extreme right ends of the upper and lower totalizer shafts 58 respectively whenever the latter are shifted longitudinally. Fig. 5 shows the resetting lever 175 at the beginning of its return stroke with the gear 176 in mesh, and the gear 177 out of mesh, with the teeth of the resetting segment. Each totalizer supporting shaft is provided with resetting notches 178 (Figs. 4 and 6) and the totalizer wheels with resetting pawls 179 having an end engageable with the notches in the shafts 58. Normally the engaging ends of the pawls are out of alignment with the notches in the shafts, but when the shaft 58 is shifted longitudinally the pawls 179 will be aligned with the notches 178 of the shaft 58, (Fig. 4) at the same time that the pinion 176 or 177 is brought into mesh with the rack segment attached to lever 175 so that when the resetting segment is operated it will rotate this gear and the notches 178 will engage and pick up the variously positioned pawls 179 and rotate the associated totalizer wheels to their zero position. The manner in which the resetting pawls cooperate with the resetting shaft to perform the resetting operation is a well known expedient and is described in the Fuller patent already mentioned. Any suitable means may be provided for compelling a full stroke of the reset lever. One form of such mechanism is shown in the Green application previously mentioned.

Normally, as before stated, the pinions 176 and 177 are out of mesh with the resetting segment 175, therefore, if the resetting segment were manipulated at this time, it is clear that it would have no effect upon the resetting shafts. The present invention contemplates a mechanism which prevents direct access to the shafts 58, by means of a hood 134 and other guards such as the guard 1330 mounted on the printer and shown in Fig. 1. The present invention further provides means automatically controlled by the printing mechanism for selectively shifting a totalizer shaft only during printing of a total from the totalizer supported thereby. This mechanism is best shown in Figs. 2, 6, 10 and 11.

Referring particularly to the Fig. 10 which shows the position of the elements comprising the present invention in their normal position, it is seen that when the control lever 148 is moved to total and reset position the arm 235 attached to shaft 146 is rocked to the dotted line position shown in Fig. 10. The machine is now conditioned for a total taking operation. The purpose of member 235 will be more fully stated hereinafter. A bracket 200 is secured to the frame 25 and extends downwardly as shown in Figs. 4 and 10. Stud 202 is provided on said bracket for pivotally supporting a flanged disk 201, the flange 203 thereof being provided with a cam portion 204 at each end thereof and arranged in operative relationship with the end portion of each of the totalizer shafts 58. Thus upon rocking of said disk in either direction one of said cam portions will engage its respective shaft and thereby shift the same inwardly against the tension of spring 58' as shown in Fig. 4. A pair of studs 205 and 206 are provided on said disk, the former of which is adapted to be engaged by curved member 210 formed in a rockable member 207. Member 207 is pivoted at 209 (Fig. 11) to a bracket 208 secured to the printer frame and therefore is adapted to move therewith for total taking operations. A spring 213 normally retains the pivoted member 207 in the position shown in Fig. 11. A projection 212 is formed on said member 207 which normally engages a shoulder 214 formed in supporting bracket 208. A lug 216 is also provided in the upper portion of bracket 208 and is adapted to contact with stud 206 carried by disk 201 when a total is taken from the lower totalizer 55. A projection 211 is also formed in member 207 to prevent excessive movement of the latter when the printer mechanism is returned to normal after effecting printing from the lower totalizer. The operation of the parts just described will now be briefly stated. After the machine has been conditioned for a total taking operation by adjusting the control lever to total and reset position, the operator may effect printing from either of the totalizers in the manner hereinbefore described. Upon taking of a total from the upper totalizer the curved member 210 will engage stud 205 on disk 201 and thereby rock the latter in a counterclockwise direction. This movement of the disk will cause the upper cam face 204 of flange 203 to engage the end of the totalizer shaft 58 supporting the upper totalizer elements and thereby shift said shaft against the tension of spring 58'. The notches 178 provided in said shaft are thus brought into operative alignment with pick-up pawls 179 carried by the totalizer elements. By shifting said shaft in this manner a pinion 176 pinned thereto will be brought into mesh with the gear segment attached to reset lever 175. The shaft will be held in this position by the straight portion of flange 203. To return the totalizer elements to zero the operator simply grasps lever 175 and draws the same downwardly thereby causing rotation of shaft 58 and the notches therein will engage the pick-up pawls regardless of the position that they may happen to be in and consequently all of the totalizer elements will be restored to zero. Similarly, when it is desired to reset the lower totalizer the printer frame is first rocked so as to effect printing from the lower totalizer. During this movement of the printer frame the member 210 will engage stud 205 and rotate disc 201 counter-clockwise as explained in connection with the upper totalizer, but upon further movement of the printer frame, the projection 216 on bracket 208 will engage pin 206 and rock disk 201 in a clockwise direction until the lower cam face 204 engages the shaft 58 of the lower totalizer to condtion the same for resetting in a manner similar to that described in connection with the upper totalizer. Upon return of the printer frame to normal position the upper surface of member 210 will engage the under portion of stud 205 due to the upward displacement of the latter when the disk 201 is moved in a clockwise direction. This will tend to retain the disk in its operated position and will cause the member 207 to swing downwardly on its pivot as it returns home. When the member 210 has cleared the stud 205, spring 213 will swing member 207 to normal position thus causing projection 212 thereof to again rest on shoulder 214 provided in bracket 208. When the control lever is moved to any position other than "Total and Reset" position arm 235 will be rocked in a clockwise direction to restore the disk 201 to normal position.

Auditor's reset lock

Under certain circumstances it may be desirable to place the resetting mechanism under the control of a special lock so that the same may be operated only by the proprietor, auditor, or other authorized persons. For this purpose, a special lock is provided which when released will condition the resetting lever for operation. This lock mechanism is best shown in Figs. 1, 2, 3, 4 and 8. Referring to the latter figure it will be seen that a bolt 220 is provided with an enlarged notch 221 for receiving the upper portion 222 of a lever 223 loosely pivoted upon the front portion of shaft 1461. Lever 223 is provided with a rearward extension 224 (Fig. 3) which carries a pin 225 engaging in a slot 226 provided in the upper portion of a double arm lever 227. The lower arm of lever 227 is pivoted to a slidable member 228 which is bifurcated at its upper end to receive shaft 40. A projection 229 on said slidable member is adapted to engage in notch 230 provided in a second slidable member 231 pivotally attached at its forward end to the resetting segment 175. Thus it is apparent that when the parts are in their normal positions as shown in Fig. 3, the resetting segment is locked against movement. When the parts are in this position totals may be taken and the totalizer shafts temporarily shifted in the manner hereinbefore described, but a resetting operation cannot be performed. In order to release the resetting segment for operation, an authorized person after placing his key in the lock will rotate the barrel 220 in a counterclockwise direction (Fig. 1) until notch 221 has moved sufficiently to permit the lever 223 to be rocked by the spring 324 (Fig. 9). The rocking of this lever will in turn rock lever 227 counterclockwise which lever will actuate slidable member 228 downwardly and thus disengage projection 229 from shoulder 230 (Fig. 3) and thereby release the reset lever 175 for operation. Resetting of the totalizer is then effected in the manner described hereinbefore.

Mechanism for releasing the shifted shafts when the machine is reconditioned for item accumulation It will be noted from what has been premised heretofore that each time the printer mechanism is rocked to effect total printing a respective totalizer shaft is shifted and held in shifted position so as to permit resetting of the totalizer elements. Therefore, it will be apparent, that means must be provided to permit the return of the shaft to normal position by the spring 58' before the register can be reconditioned for item accumulation, and for this purpose the following mechanism has been provided. As heretofore described in connection with the control means for the total printing mechanism, a bell crank 168 is rocked upon movement of shaft 146 (Figs. 8, 9 and 12) through connections 170, 167 and 166. Pinned to shaft 146 and extending rearwardly and upwardly therefrom is an arm 235 (Fig. 10). The upper surface 235ª thereof normally engages stud 236 on disk 201 while the surface 235ᵇ thereof normally engages stud 237 also provided on said disk.

When the control lever 148 is in any position other than "Total and Reset" position arm 235 assumes the position shown in full lines in Fig. 10. Therefore, the disk 201 is locked against operation. However, when the control lever 148 is brought to "Total and Reset" position the arm 235 will be rocked to the dotted line position shown in said figure and the disk 201 is then free to move in either direction. Thus it is clear that after a total taking operation has been effected and the control lever is moved to one of its other positions of adjustment to condition the machine for item accumulation, the disk 201 will be moved to normal position. This movement of said control lever will cause rocking of shaft 146 in a reverse direction and thus the arm 235 will be returned to its normal position. During this return movement of arm 235 its faces 235ª or 235ᵇ respectively will engage studs 236 or 237 depending upon the direction in which disk 201 has previously been rocked and consequently the latter is returned to normal position. The shifted shaft 58 will then be returned to normal position by virtue of its spring 58' shown in Fig. 4 which as was pointed out before is placed under tension when said shaft is shifted by a cam 204.

Secret total mechanism

The foregoing description of Figs. 1 to 11 inclusive, is for one form of the present invention, in which anyone having the key for unlocking the control lever 148, can print from either totalizer; but in order to reset the totalizers, it is necessary to operate the lock 220 by a separate key thereby removing the projection 229 out of the notch 230 on the slide 231 connected to the reset lever 175. In certain instances, however, it may be desirable to permit printing from and resetting of one of the totalizers by an employee, while printing from and resetting of the other totalizer is reserved for the proprietor, auditor or other authorized person. Such a situation may arise in a store where the manager operates the register, using one of the clerk's keys; or where two clerks handle separate departments under different supervision.

A modified form of mechanism designed to operate in the latter manner is illustrated in Fig. 12. In this modified form, the special lock 220 hereinbefore described, instead of releasing the reset lever for operation, is designed to control the operation of the printing and resetting mechanisms for the lower totalizer. Certain parts, such as the bell crank 223 and double arm lever 227 shown in Fig. 3, are not incorporated in the modification of Fig. 12. However, other features of the machine previously described—such as the mechanism compelling printing before resetting—are retained in the Fig. 12 device. An arm 228' in Fig. 12 replaces the arm 228 of Fig. 3, but is actuated in a different manner, as will be presently described. Pivoted loosely upon shaft 146 is a bell crank 240 provided with an upwardly extending arm 241 registering with an enlarged notch 242 provided in the bolt of the special lock 220. The rearward extension 243 integral with bell crank 240 is spring urged and takes the place of the heretofore described locking arm 145 of Fig. 9. When the control lever 148 is operated, arms 165 and 243 are simultaneously operated by cam 162 in a manner somewhat similar to that previously described in connection with the operation of arm 145. Arm 243, however, is provided with a projection 244 adapted to limit the rocking movement of the printer mechanism so as to prevent the taking of a total from the lower or grand totalizer. As shown in Fig. 12 member 128' is pivoted at its lower end to bell crank 165 at 245 and therefore it is seen that member 128' will move immediately upon movement of bell crank 165 when the latter is actuated by cam 162 and projection 229 will be withdrawn from shoulder 230 thus releasing the reset lever for operation.

The operation of the parts just described will now be briefly stated. When an authorized person places his key in lock 153 to release the control lever 148 for operation the latter may be moved to "Total and Reset" position. Upon movement of the control lever, the bell crank 165 is rocked counterclockwise as described above in connection with Figs. 7 and 9. The pin and slot connection associated with bell crank 165 thereby causes a downward movement of arm 168. The latter releases the lock arm 243 on bell crank 240 which moves downwardly under the influence of spring 169 until the bell crank is stopped by contact with the rear edge of slot 242. This movement of arm 243 is sufficient to clear the pin 147 carried by the printer frame and thereby release the printer mechanism for operation so that a total may be printed from the upper totalizer. Similarly upon movement of bell crank 165 which is connected to arm 228 by a pin 245, projection 229 on slidable member 228 will be withdrawn from its engagement with notch 230 in slidable member 231 and thereby the reset lever is released for operation, and printing from and resetting of the upper totalizer may then be effected. In order to print from, and reset the lower or grand totalizer it is necessary to actuate the special or secret total lock. When a key is placed in this lock and the bolt thereof rotated counterclockwise it will permit spring 169 to impart a further downward movement to the extension 243 thereby removing the lug 244 from the path of movement of the locking pin 147 carried by the printer mechanism. Therefore it is seen that the printer mechanism may now be rocked sufficiently to effect printing from the lower totalizer. Resetting of said totalizer may also be effected in the manner heretofore described.

The nature of the improved mechanism is such that in order to make the foregoing description as clear as possible it was necessary to state the operation considerably in detail as an incident to explaining the various features of construction. Therefore, a complete restatement here of the operation is believed to be unnecessary.

While the form of mechanism herein shown and described is admirably adapted to fulfill the objects primarily stated, it is to be understood that it is not intended to confine the invention to the two forms of embodiment herein shown, since it may be embodied in various forms, all coming within the scope of the claims which follow:

What is claimed is:

1. In a machine of the class described the combination of an accumulative device, printing means for printing the accumulated total therefrom, of a resetting member adapted to reset said accumulative device, a shaft supporting said accumulative device, a rockable member provided with means for engaging said shaft and moving the same into operative relationship with the resetting member, and means for rocking said last mentioned member, in coordination with the operation of the printing means to compel printing of a total before the accumulative device may be reset.

2. In a machine of the class described, a plurality of printing totalizers, printing devices for printing the accumulated totals therefrom, a resetting member adapted to reset said totalizers, a plurality of shafts one for supporting each of said totalizers, a rockable member provided with means for engaging any of said shafts to condition the same for a resetting operation, and means for rocking said last mentioned member when a total is printed from any one of said totalizers.

3. In a machine of the class described, the combination of a plurality of totalizers, printing devices for printing the accumulated totals therefrom, a normally locked member for resetting any one of said totalizers, means for selectively conditioning said totalizers for resetting, said last mentioned means being actuated when a total is printed from any one of said totalizers, and key operated means for releasing said resetting member for operation.

4. In a machine of the class described, a control lever, a totalizer, means for printing directly from said totalizer, a resetting member, means for conditioning said totalizer for resetting, said last mentioned means being actuated by said printing means, and means operated by said control lever for restoring said conditioning means to normal position.

5. In a registering machine, the combination of a plurality of accumulative devices, resetting means associated therewith, manipulative printing devices for printing totals from said accumulative devices, a shiftable shaft carried by each of the accumulative devices to render said resetting means effective or ineffective; and means interposed between said shaft and said printing devices for shifting the shaft to render the resetting means effective after a total has been printed.

6. In a registering machine, the combination with a plurality of accumulative devices, a printing mechanism adapted to print totals therefrom, normally ineffective resetting means for the said accumulative devices, means for rendering said resetting means effective when a total is printed, a key operated lock, and means under control of said lock, for locking and unlocking said means, whether or not a printing operation has been performed.

7. In a registering machine, the combination with accumulative devices having a printing mechanism associated therewith for printing totals therefrom, of a resetting means adapted to reset said accumulative devices, means for conditioning said accumulative devices for resetting, means carried by said printing mechanism and engageable with said conditioning means to actuate the same each time a total is printed, control means for conditioning said printing mechanism for operation, and means actuated by said control means for restoring said conditioning means to normal position.

8. In a machine of the class described, a plurality of totalizers, printing means for printing from any one of said totalizers, resetting means common to the totalizers and adapted to reset any one of said totalizers, a control lever, means operated by said lever for releasing said resetting means for operation, additional locking means for preventing printing from another of said totalizers, and means for releasing said locking means.

9. In a machine of the class described, the combination of a plurality of type carrying totalizers, printing means therefor, means for rocking the printing mechanism to effect printing from any one of said totalizers, a flanged member cooperating directly with the shafts supporting said totalizers to condition the same for a resetting operation, and means attached to said member adapted to cooperate with said printing means when the latter is rocked to effect printing, said attached means being so arranged that when a total is taken from one of the totalizers said flanged member will be rocked in one direction and when a total is taken from another totalizer it will be rocked in the reverse direction.

10. In a machine of the class described, the combination of a plurality of printing totalizers, means for printing from either of said totalizers, means for resetting said totalizers, a flanged disk interposed between said printing and resetting means, cam means provided on the flange of said disk for shifting the shafts supporting said totalizers and thereby conditioning the resetting means for operation and means for restoring said disk to inoperative position.

11. In a machine of the class described, the combination of a plurality of type carrying totalizers, differentially movable printing means therefor, a differentially movable control member for conditioning the machine for various types of operations, an adjustable locking member for said printing means so constructed that when in normal position it is effective to prevent printing from all of said totalizers, means actuated by said control lever when moved to one of its positions of adjustment for positioning said locking member so as to permit printing from one of said totalizers, key operated means for actuating said locking member to permit printing from all of said totalizers, a normally locked reset lever, means actuated by said control member for releasing said reset lever for operation, a rockable member for conditioning the totalizers for a resetting operation, said last mentioned member being movable in one direction when printing is effected from one of said totalizers and movable in another direction when printing is effected from another of said totalizers and means for restoring said conditioning member to normal position.

12. In a machine of the class described, the combination of a plurality of printing totalizers, normally locked means for printing from any one of said totalizers, a control member movable to various positions of adjustment, means for releasing said printing means for operation when said control member is moved to one of its positions of adjustment, a normally locked reset lever, key operated means for releasing said lever for operation, a rockable member, means provided on said rockable member for engaging the end portions of each of the totalizer shafts for conditioning the totalizers for resetting, means actuated by the printer frame during a total taking operation for rocking said rockable member to condition the totalizer from which printing was effected for resetting, thereby compelling a printing operation before resetting of the totalizer can be effected, and means actuated by said control lever for restoring said rockable member to normal position.

13. In a register, a resetting shaft, a plurality of rotatable totalizer elements supported thereby, a manipulative device for printing from said totalizer elements, a separately manipulative element adapted to be connected to and disconnected from said shaft, and means responsive to the operation of said manipulative device for connecting said manipulative element to said shaft.

14. In a register, a rotatable shaft, a plurality of totalizer elements mounted thereon, means for resetting said totalizer elements, said means comprising a rotatable element having a cam surface adapted to shift said shaft longitudinally, a device adapted to rotate said element and lock the latter in one position of adjustment, and means to rotate the shaft to zeroize the totalizer elements.

15. In a machine of the class described, a resetting shaft, a plurality of rotatable totalizer elements supported thereby, said shaft having means for zeroizing the totalizer elements and a gear by which the shaft may be rotated, a manipulative resetting gear adapted to rotate said shaft, a separately manipulative device for printing totals, and means responsive to the operation of the printing device for engaging the totalizer shaft gear with said resetting gear.

16. In a machine of the class described, a shaft, a plurality of rotatable totalizer elements supported thereby, means requiring axial movement of the shaft as a preliminary to resetting of the totalizer elements, a device for printing the totals represented by said totalizer elements, and means for simultaneously operating said printing device and moving said shaft axially, whereby to condition the totalizer elements for a resetting operation.

17. In a machine of the class described, a plurality of printing totalizers, printing devices for printing the accumulated totals therefrom, a resetting member adapted to reset said totalizers, a plurality of shafts one for supporting each of said totalizers, a rockable member provided with means for engaging any of said shafts to condition the same for a resetting operation, means for rocking said last mentioned member when a total is printed from any one of said totalizers, and a key operated lock having means for preventing the resetting of at least one of said totalizers.

18. In a machine of the class described, the combination of a plurality of accumulative devices, printing devices for selectively printing the accumulated totals therefrom, a resetting member, connecting means between the resetting member and the totalizers, and means to automatically operate the connecting means, whenever the printing devices are operated, to connect the proper totalizer with the resetting member.

19. In a machine of the class described, the combination of a totalizer, means for printing directly therefrom, resetting elements normally lying in ineffective position, a normally locked member to operate the resetting elements, means requiring the printing of a total from said totalizer to move the resetting elements to effective position, and key operated means for releasing said normally locked member for operation.

20. In a machine of the class described, the combination of a plurality of accumulating devices, a printing mechanism adapted to print totals therefrom, resetting elements normally lying in ineffective position, a normally locked member to operate the resetting elements, means requiring the printing of a total from one of the accumulating devices to move the resetting elements to effective position, and key operated means for releasing said normally locked member for operation.

CHARLES W. GREEN.

CERTIFICATE OF CORRECTION.

Patent No. 1,989,314.                                                                                       January 29, 1935.

CHARLES W. GREEN.

It is hereby certified that error appears in the printed specification of the above numbered patent requiring correction as follows: Page 8, first column, strike out lines 40 to 49 inclusive, comprising claim 6; and for the present claim numbers, 7, 8, 9, 10, 11, 12, 13, 14, 15, 16, 17, 18, 19 and 20, read 6, 7, 8, 9, 10, 11, 12, 13, 14, 15, 16, 17, 18 and 19; and that the said Letters Patent should be read with these corrections therein that the same may conform to the record of the case in the Patent Office.

Signed and sealed this 12th day of March, A. D. 1935.

(Seal)

Leslie Frazer
Acting Commissioner of Patents.